March 3, 1970  B. L. WRIGHT  3,497,938
APPARATUS FOR INSERTING AND FASTENING TERMINAL ELEMENTS
INTO A TERMINAL STRIP
Filed July 21, 1967  5 Sheets-Sheet 1
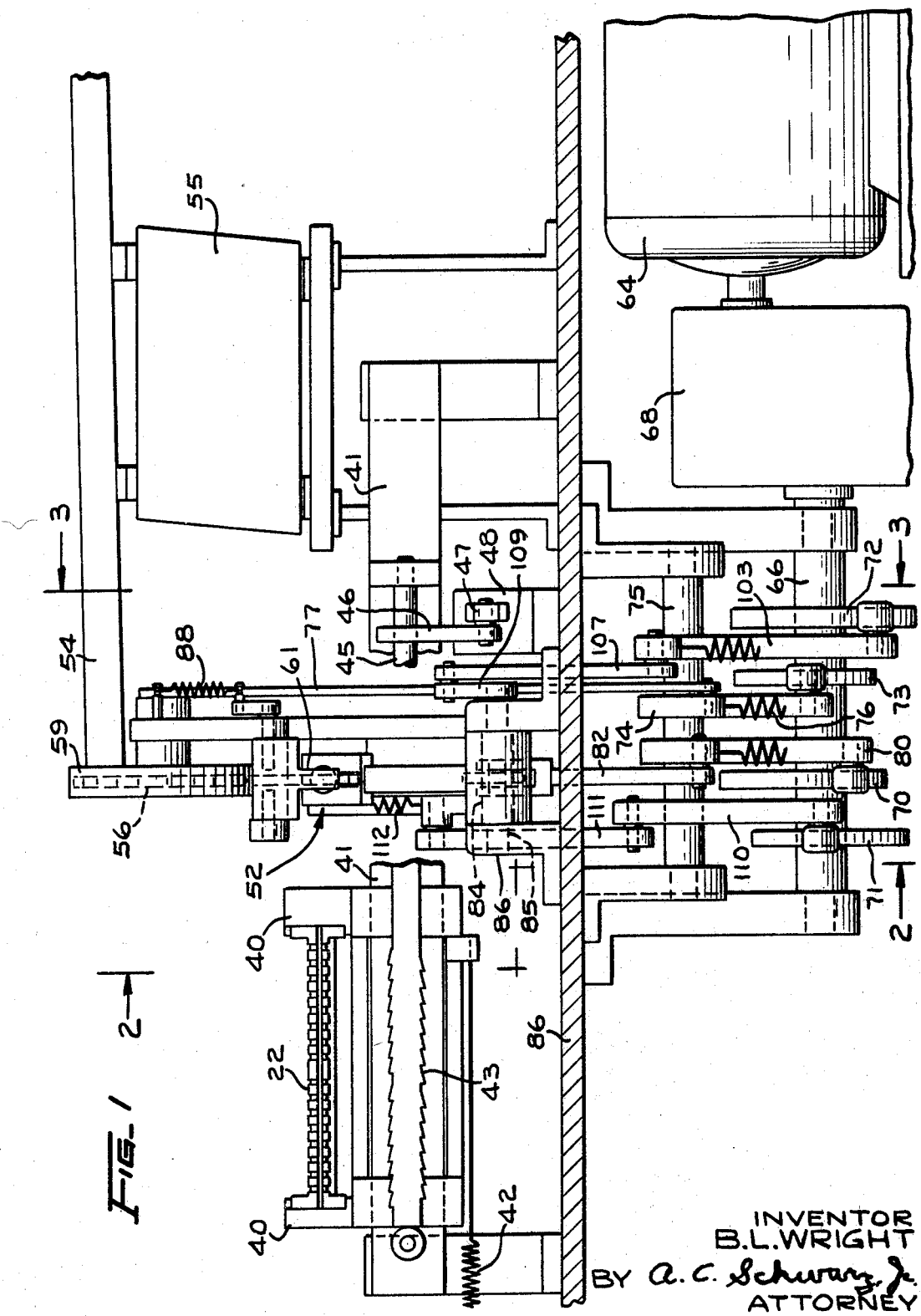
INVENTOR
B.L. WRIGHT
BY A. C. Schwarz Jr.
ATTORNEY

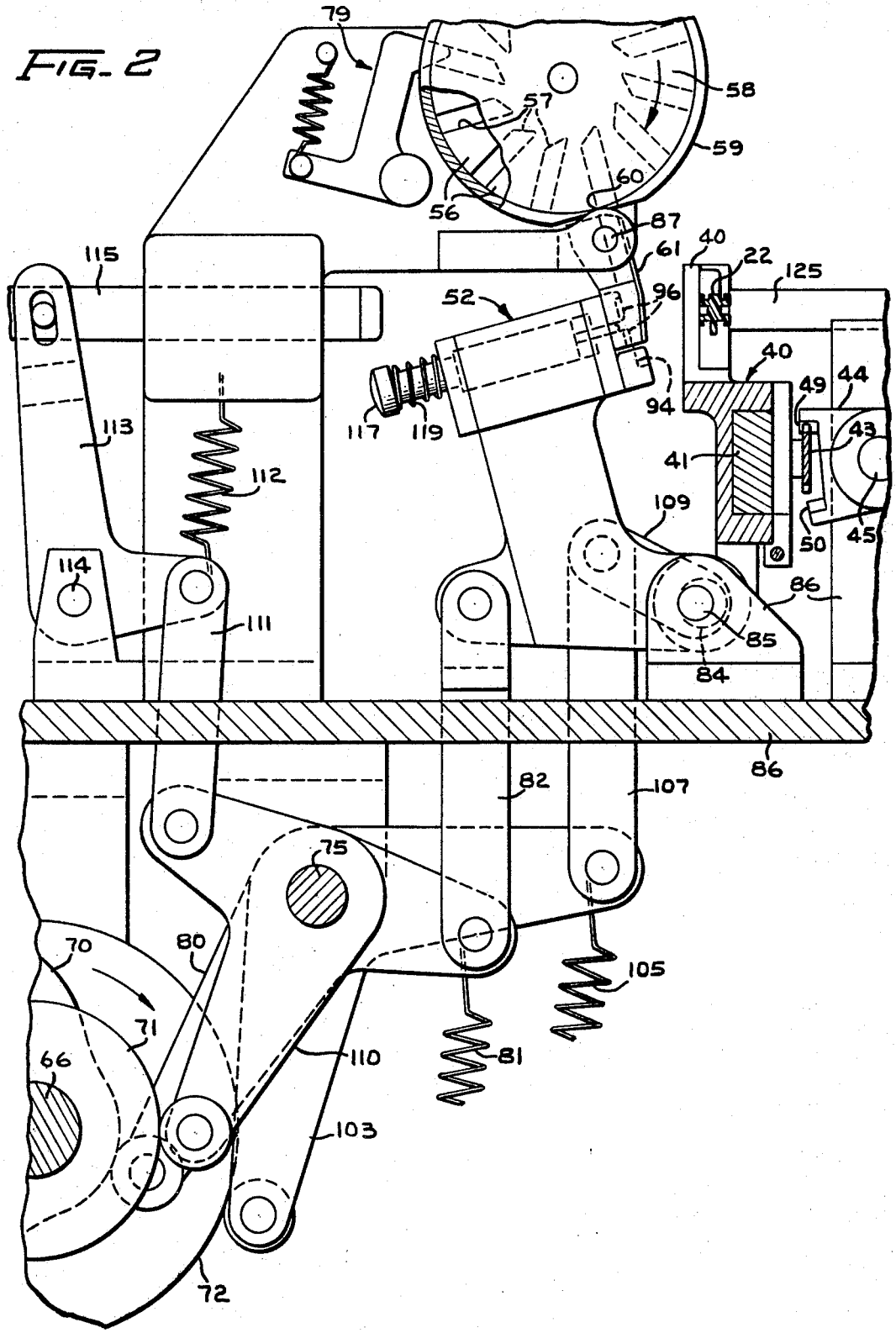

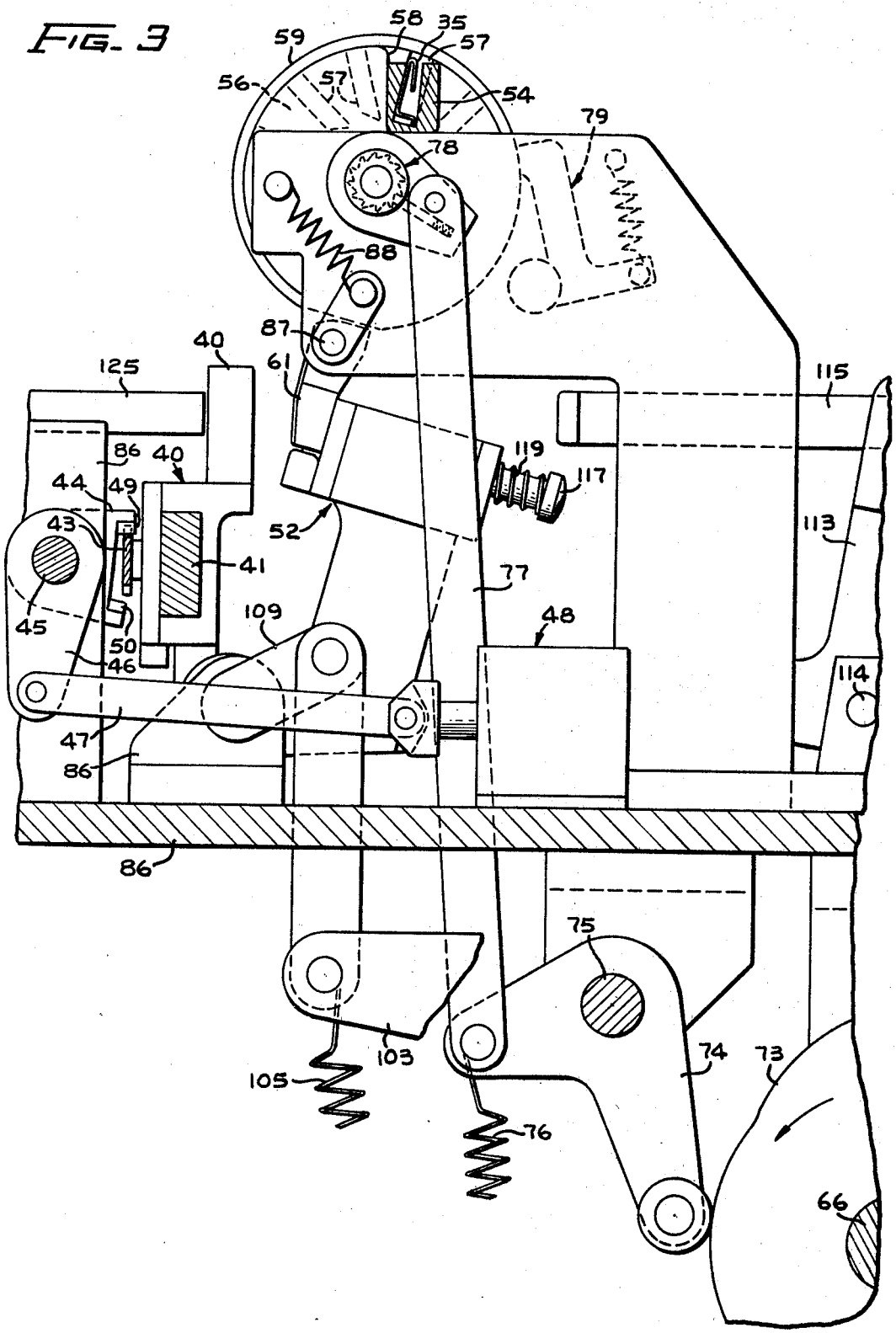

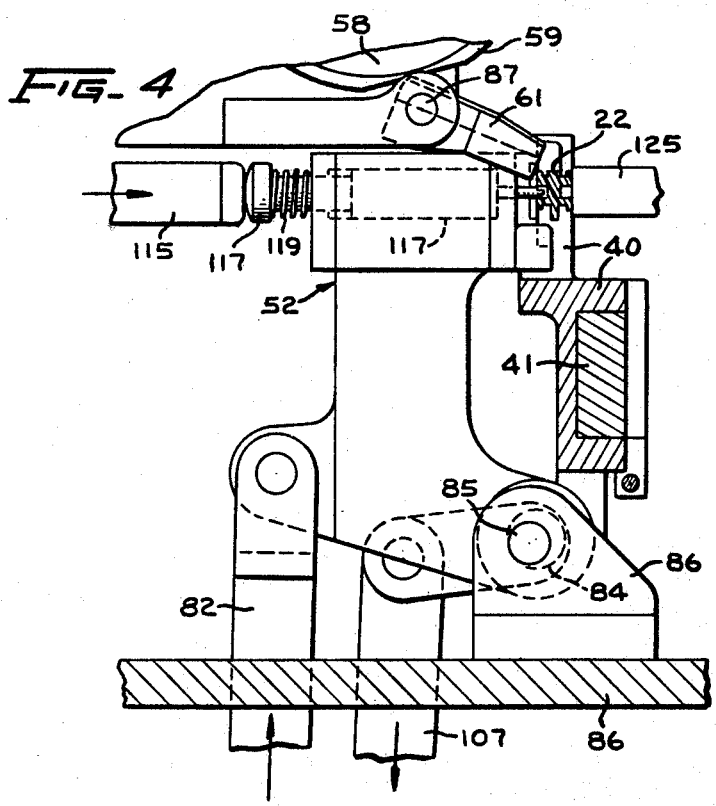
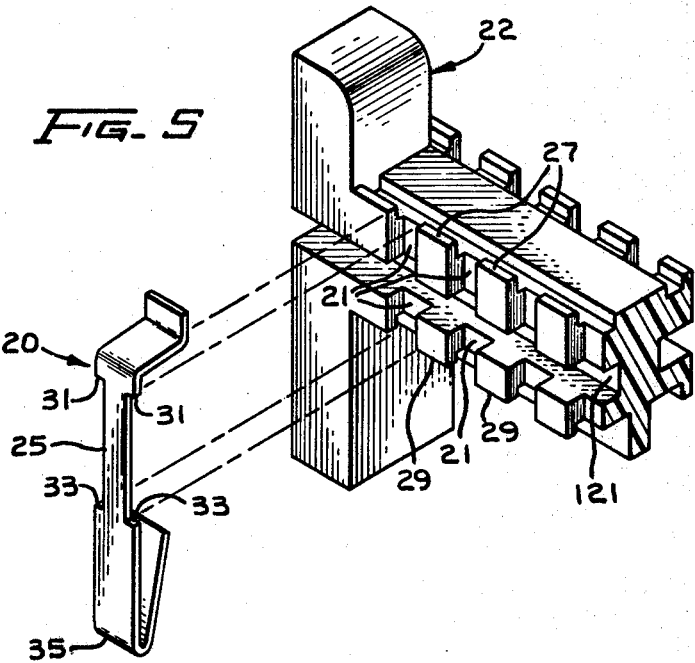

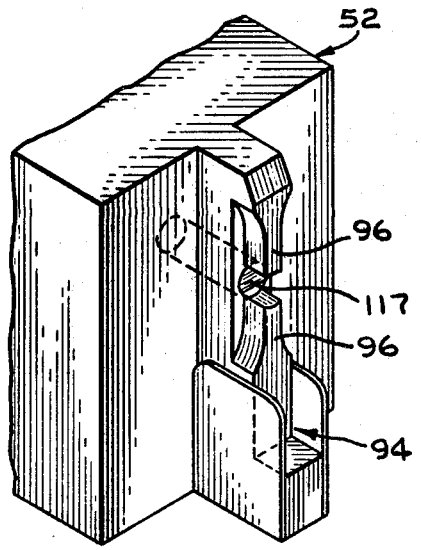
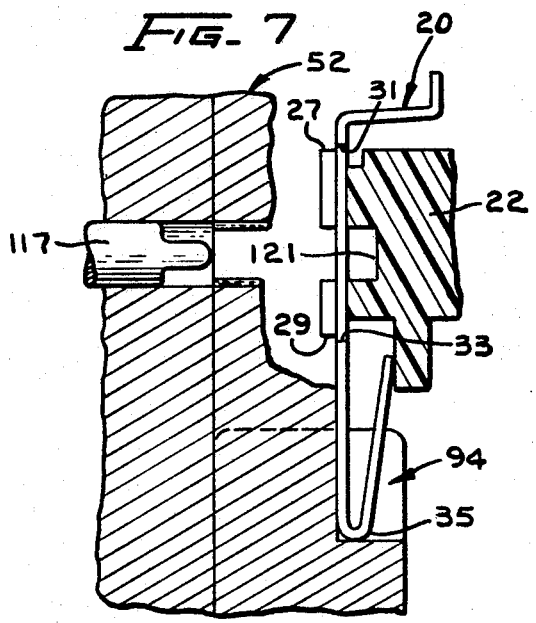
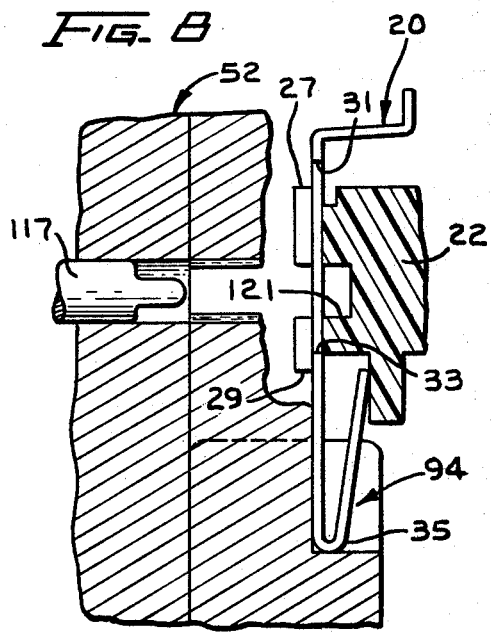
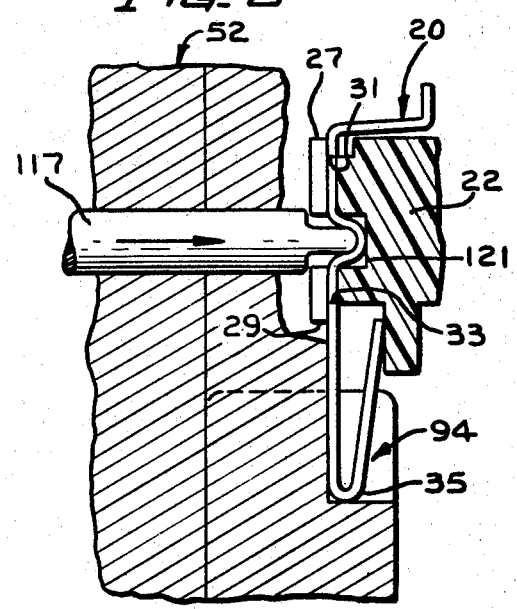

United States Patent Office 3,497,938
Patented Mar. 3, 1970

3,497,938
APPARATUS FOR INSERTING AND FASTENING TERMINAL ELEMENTS INTO A TERMINAL STRIP
Ben L. Wright, Chicago, Ill., assignor to Western Electric Company, Incorporated, New York, N.Y., a corporation of New York
Filed July 21, 1967, Ser. No. 655,020
Int. Cl. H01r 1/00
U.S. Cl. 29—203            9 Claims

ABSTRACT OF THE DISCLOSURE

An apparatus for successively attaching a plurality of contacts or terminal elements into laterally extending grooves in a plastic terminal strip, wherein the grooves are bisected by a longitudinally extending channel having a depth greater than the grooves, by inserting each terminal element into a groove, moving the element longitudinally and bending the midportion of the element into the channel, thereby foreshortening the element and causing outwardly-extending portions of the terminal element to engage overhanging portions of the plastic terminal strip, thus permanently holding the terminal element in place.

FIELD OF THE INVENTION

This invention relates to the assembly of electrical connectors and more particularly to apparatus for assembling electrical connectors that are formed by inserting conductive contact or terminal elements into grooves in an insulating terminal strip and then fastening them into place.

BACKGROUND OF THE INVENTION

Electric connectors of the above-mentioned type are usually made by hand by manually setting contact elements into the grooves in the terminal strip and then manually fastening them. However, such methods of assembly are time-consuming and costly; therefore, it is an object of the present invention to provide an apparatus for automatically assembling contact elements into terminal strips and locking the elements into place.

It is another object of the present invention to mount contact elements seriatim into grooves in a terminal strip and to foreshorten the contact elements in order to lock them firmly into place.

SUMMARY OF THE INVENTION

In accordance with the preferred embodiment of the present invention, apparatus is provided to orient automatically an elongated contact or terminal element in the desired direction and to insert the element into a groove in a terminal strip. The terminal element is then foreshortened in its elongated direction in order to lock the terminal element into place in the terminal strip.

BRIEF DESCRIPTION OF THE DRAWINGS

Other objects, advantages and novel aspects of the invention will become apparent upon consideration of the following detailed description, in conjunction with the accompanying drawings, in which:

FIG. 1 is a front elevational view of a machine for practicing the present invention and shows the plastic terminal strip positioned to one side, away from the terminal inserting head, to illustrate more thoroughly the details of the mechanism;

FIG. 2 is an enlarged, cross-sectional view of the terminal inserting mechanism taken along line 2—2 of FIG. 1 with the terminal inserting head shown in the position for receiving terminals for later insertion;

FIG. 3 is an enlarged, cross-sectional view of the terminal inserting machine taken along line 3—3 of FIG. 1, which shows the terminal inserting head from the direction opposite to that shown in FIG. 2;

FIG. 4 is a fragmentary view of the mechanism of FIG. 2 but shown in the final step of terminal insertion;

FIG. 5 is an enlarged view of a spring metal terminal element prior to insertion into the terminal strip and a fragmentary view of the plastic terminal strip with dashed lines showing the path of insertion of the terminal element into the terminal strip;

FIG. 6 is an enlarged view, in perspective, of the face portion of the inserting head showing its profile for inserting terminals into the terminal strip; and FIGS. 7, 8, and 9 illustrate a sequence of some of the steps involved in inserting terminals into the terminal block according to the present invention.

DETAILED DESCRIPTION

Referring to the drawings and more particularly to FIG. 5, the principal objective of the apparatus of the present invention is to insert a plurality of terminal elements 20 into a plurality of openings or grooves 21 in a molded plastic terminal strip 22. The terminal element 20 is formed from a flat piece of electrically-conductive spring material and has a central portion 25 of reduced width that fits into the groove 21 in the terminal strip 22.

The plastic terminal strip 22 is formed with upstanding end portions 27 at the upper ends of the grooves 21 and with downwardly extending end portions 29 at the lower ends of the grooves. These end portions cooperate with tab ears 31 and 33 of the terminal element 20 when the central portion 25 of the terminal element 20 is foreshortened, thereby locking the terminal element into place in the terminal strip. A bottom end 35 of the terminal element 20 is an electrical contact for cooperating with a mating plug.

Referring now to FIGS. 1, 2, and 3, the terminal strip 22 is placed in an escapement-controlled rack 40 which is then moved manually to the extreme right along a track 41, in FIG. 1, against the bias of a spring 42 which urges the rack 40 to the left. The teeth of a two sided escapement 43 mounted on the rack 40 engage a single escapement arm 44 (FIGS. 2 and 3) that is fixed to a shaft 45 that is oscillated rotationally by a crank 46 and a pull bar 47 in response to alternate energization and release of magnet 48. Two escapement pawls 49 and 50 are formed on the escapement arm 44 and alternately engage the teeth of the escapement 43 as the shaft 45 oscillates, in order to permit the rack 40 with the terminal strip 22 to move intermittently from right to left in FIG. 1 under the urging of the spring 42. This successively places the several grooves 21 of the terminal strip 22 in front of an inserting head 52 formed in the shape of a bell crank, that inserts the terminal elements 20 one at a time into the grooves 21 as the terminal strip is indexed under the control of the escapement 43 and the escapement arm 44.

The terminal elements 20 are carried on a track 54 that is vibrated by a shaker 55 to deliver them to a rotary escapement wheel 56 that has a plurality of openings 57 around its periphery for receiving and accepting only one terminal element at a time from the vibrating rack 54. Two end plates 58 and a peripheral band 59 confine the terminal elements 20 within the openings 57. The rotary escapement wheel 56 is then rotated counterclockwise as shown in FIG. 3, and each terminal element 20 in turn is brought from the orientation shown in FIG. 3 with its bottom end 35 up, to a position wherein its bottom end 35 is directed downwardly at an opening 60 (FIG. 2) in the peripheral band 59. The terminal element 20 then drops through the opening 60 and along a chute 61 into position in the inserting head 52. The chute 61, in cooperation with the contours of the face of the inserting head 52, forms a nest that confines the terminal element, with the chute 61 preventing the escape of the terminal element.

In order to operate the inserting machine, a motor 64 (FIG. 1) rotates a shaft 66 through a gear box 68. Four plate cams 70, 71, 72, and 73 are firmly mounted to and rotate with the shaft 66. The rotary escapement wheel 56 is advanced by the cam 73 that rotates a bell crank 74 clockwise (FIG. 3) about a pivot shaft 75 against a return spring 76 and pushes a connecting rod 77 upwardly to advance a ratchet drive mechanism 78. The rotary escapement wheel 56 is thereby rotated against the detenting action of a spring-loaded detent 79 which assures that the rotary escapement wheel 56 always advances by precisely the increment of a single opening 57.

After a terminal element falls trough the opening 60 in the peripheral band 59, the cam 70 rotates a bell crank 80 (FIGURE 2) about the pivot shaft 75 against the urging of a return spring 81. This raises a link 82 that rotates the bell-crank-shaped inserting head 52 about its pivot 84 that is eccentrically mounted on a shaft 85 which is rotatably mounted in the frame 86 of the machine. When the inserting head 52 rotates clockwise about its pivot 84, it pushes the chute 61 counterclockwise out of the way and rotates the chute 61 about its pivot 87 against the urging of a return spring 88 (FIG. 1), to the position shown in FIG. 4. The clockwise rotation of the inserting head 52 also causes the insertion of the contact element 20 into a groove 21 in the terminal strip 22.

FIG. 6 shows, in persepctive, the face of the inserting head 52. The bottom end 35 (FIG. 5) of the terminal element 20 rests in a trough 94 (FIG. 6) which cooperates with the lower end of the chute 61 (FIG. 2) to receive and confine the terminal element. Two narrow portions 96 of the face of the inserting head 52 engage the central portion 25 of the terminal element 20 (FIG. 5) and firmly insert the terminal element into the groove in the terminal strip 22. The initial position of the terminal element upon insertion is shown in FIG. 7 wherein the narrow portions 96 of the inserting head are shown cut away to illustrate better the relative positions of the terminal element 20 and the terminal strip 22.

Once the terminal element has assumed the position shown in FIG. 7, further rotation of the drive shaft 66 (FIGS. 1, 2, and 3) brings a low portion of the cam 72 into engagement with a bell crank 103. This permits a spring 105 to rotate the bell crank 103 clockwise (FIG. 2) about the pivot shaft 75, thereby lowering a link 107 from the position shown in FIGS. 2 and 3 to the position shown in FIG. 4. A crank 109 is firmly mounted at one end to the shaft 85 and is pinned at its other end to the link 107. Therefore, when the link 107 is lowered, it rotates the shaft 85, eccentrically moving the pivot 84 to raise the inserting head 52. Upward movement of the inserting head 52 carries the terminal element 20 upward from the position shown in FIG. 7 until the lower tab ears 33 (FIG. 5) of the terminal element 20 are positioned behind the downwardly extending end portions 29 of the terminal strip 22 on either side of the groove 21 (as shown in FIG. 8).

As soon as the terminal element 20 assumes the position shown in FIG. 8 a high point on the cam 71 rotates a bell crank 110 counterclockwise (FIG. 2) about the pivot shaft 75. This lowers a connecting link 111 against the urging of a return spring 112 and rotates another bell crank 113 clockwise about a fixed pivot 114. Clockwise rotation of the bell crank 113 drives a ram 115 to the right. When moving to the right, the ram 115 engages the left-most end of a plunger 117 within the inserting head 52 and moves it to the right against its return spring 119.

Referring now to FIGS. 5, 8, and 9, as the plunger 117 moves to the right, it bends the central portion 25 of the terminal element 20 into a channel 121 that is formed in the terminal strip 22 transversely of the grooves 21 and which is significantly deeper than these grooves. Deflection of the central portion 25 of the terminal element 20 foreshortens this central portion, thereby bringing the tab ears 31 behind the upstanding end portions 27 of the terminal strip 22. This effectively locks the terminal element into place in the terminal strip.

Referring again to FIGS. 1, 2, 3, and 4, the terminal strip 22 is only lightly supported at its ends in the rack 40. The force applied by the plunger 117 against the terminal element 20 and the terminal strip 22 would only tend to bend the terminal strip away from the inserting head 52, and the terminal element 20 would not be firmly locked into place. To prevent the terminal strip 22 from bending excessively under the force of the plunger 117, an anvil 125 is firmly mounted to the frame 86 and is positioned adjacent the terminal strip 22. When the plunger 117 deflects the central portion 25 of the terminal element 20 into the channel 121 of the terminal strip 22, the terminal strip deflects only enough to bear against the anvil 125; and the force applied by the plunger 117 is then transmitted through the terminal strip 22 to the anvil 125 and to the frame 86 of the machine.

Further rotation of the shaft 66 moves the high point of the cam 71 away from the bell crank 110, thereby permitting the return spring 112 to rotate the bell crank 113 counterclockwise to retract the ram 115 to the left. This permits the return spring 119 to carry the plunger 117 to its initial position. The cam 72 lowers the inserting head 52 to clear the bottom end 35 of the contact element 20, and cam 70 then returns the inserting head 52 to its initial position at which the return spring 88 (FIG. 3) returns the chute 61 to its original position (as shown in FIG. 2).

The magnet 48 (FIG. 3) is then energized to move the pull bar 47 to the right and rotate the shaft 45, the crank 46, and the escapement arm 4 counterclockwise (FIG. 3). This moves the pawl 49 out of engagement with the escapement 43 and moves the pawl 50 into engagement with the escapement 43. Because the teeth on top of the escapement 43 (FIG. 1) are not directly over the teeth on the bottom of the escapement 43, the spring 42 advances the terminal strip 22 to the left (FIG. 1) by a slight amount. The magnet 48 is then deenergized and the pawls 49 and 50 assume the same position shown in FIG. 3; however, the spring 42 continues to advance the terminal strip until the next tooth on the top of the escapement 43 strikes the pawl 49 which stops the rack 40 and the terminal strip 22 in a position wherein the next groove in the terminal strip 22 is in front of the inserting head 52 for the start of another cycle of the machine, for inserting another terminal element.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for mounting an elongated, conductive terminal element in a predetermined orientation in a nonconductive terminal strip, said strip having at least one groove therein for receiving said terminal element lengthwise in the groove, and apparatus comprising:

means for orienting said terminal element in the predetermined direction;

means for inserting said terminal element into the groove in the terminal strip;

means for foreshortening said terminal element in the direction of its elongation to less than its original length to lock said terminal element into place in said terminal strip; and means for supporting the foregoing means in co-operative positional relationship.

2. An apparatus according to claim 1 further comprising:
   means for moving the terminal element in one direction within the groove in the terminal strip prior to the foreshortening of said terminal element.

3. An apparatus according to claim 1 further comprising:
   means for delivering only one terminal element at a time to said inserting means.

4. An apparatus according to claim 1 wherein said inserting means comprises:
   a member having a trough for containing the terminal element;
   means for preventing the terminal from escaping from the trough; and
   means for moving said member toward the terminal strip and for disabling said preventing means.

5. An apparatus according to claim 4 wherein said moving means comprises a bell crank having a pivot and two crank ends, one crank end of which forms a part of said member.

6. An apparatus according to claim 1 for mounting a terminal element in a groove in a nonconducting terminal strip having extending end portions at each end thereof, wherein said foreshortening means foreshortens said terminal element by an amount substantially equal to the distance that the end portions extend beyond the ends of the groove.

7. An apparatus according to claim 1 wherein said foreshortening means comprises:
   means for deforming said terminal element in a direction perpendicular to the length of said element.

8. An apparatus according to claim 7 for inserting a terminal element into a terminal strip having at least one channel perpendicular to the length of the groove and intermediate the ends of the groove, wherein said deforming means comprises means for deflecting a portion of said terminal into the channel after insertion of the terminal element into the groove.

9. An apparatus according to claim 1 further comprising:
   means for indexing the terminal strip to bring successive grooves into position to accept terminal elements from said inserting means.

References Cited

UNITED STATES PATENTS

| | | | |
|---|---|---|---|
| 2,659,406 | 11/1953 | Locke | 29—203 X |
| 3,004,262 | 10/1961 | Cubbidge et al. | |
| 3,144,706 | 8/1964 | Vrsecky. | |
| 3,200,481 | 8/1965 | Lenders. | |

THOMAS H. EAGER, Primary Examiner

U.S. Cl. X.R.

29—206